(12) United States Patent
Lee et al.

(10) Patent No.: US 10,461,356 B2
(45) Date of Patent: Oct. 29, 2019

(54) JIG HAVING VARIABLE STRUCTURE DEPENDING ON SIZE OF RECEIVING PORTION OF CASE

(71) Applicant: LG Chem, Ltd., Seoul (KR)

(72) Inventors: Jin Kyu Lee, Daejeon (KR); Jeong Min Kim, Daejeon (KR); Chan Ki Park, Daejeon (KR); Jae Han Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 115 days.

(21) Appl. No.: 15/873,636

(22) Filed: Jan. 17, 2018

(65) Prior Publication Data

US 2018/0205107 A1   Jul. 19, 2018

(30) Foreign Application Priority Data

Jan. 19, 2017   (KR) ........................ 10-2017-0009044

(51) Int. Cl.
| | |
|---|---|
| *H01M 10/04* | (2006.01) |
| *B29C 33/30* | (2006.01) |
| *B21D 22/20* | (2006.01) |
| *H01M 2/02* | (2006.01) |

(52) U.S. Cl.
CPC ....... *H01M 10/0404* (2013.01); *B29C 33/308* (2013.01); *H01M 2/0287* (2013.01); *B21D 22/20* (2013.01); *H01M 2/0202* (2013.01); *H01M 2002/0205* (2013.01)

(58) Field of Classification Search
CPC ........... H01M 10/0404; H01M 2/0287; H01M 2/0202; H01M 2002/0205; B29C 33/308; B21D 22/20

See application file for complete search history.

(56) References Cited

U.S. PATENT DOCUMENTS

| | | | |
|---|---|---|---|
| 9,005,791 B2* | 4/2015 | Kong | H01M 2/00 219/117.1 |
| 2015/0000117 A1* | 1/2015 | Cho | H01M 10/0404 29/623.2 |
| 2015/0113796 A1* | 4/2015 | Han | H01M 10/0436 29/623.1 |
| 2015/0200417 A1* | 7/2015 | Song | H01M 10/0431 429/127 |

(Continued)

FOREIGN PATENT DOCUMENTS

| | | |
|---|---|---|
| KR | 10-2011-0128594 A | 11/2011 |
| KR | 10-2014-0019933 A | 2/2014 |
| KR | 10-2014-0104538 A | 8/2014 |

*Primary Examiner* — Stewart A Fraser
(74) *Attorney, Agent, or Firm* — Mintz Levin Cohn Ferris Glovsky and Popeo, P.C.; Kongsik Kim; Jhongwoo Jay Peck

(57) ABSTRACT

Present disclosure relates to a variable jig which is a jig device to manufacture a battery cell in which an electrode assembly is embedded in a battery case made of a laminate sheet including a resin layer and a metal layer, including a die assembly having an inwardly recessed structure corresponding to a storage configured to mount the electrode assembly located on the laminate sheet or a portion to be molded as the storage; and a fixing die configured to fix an outer periphery of the sheet in a normal position, wherein the die assembly is configured to allow adjustment of at least one of a width or a length of the inward recess according to a size of the electrode assembly.

12 Claims, 4 Drawing Sheets

(56) References Cited

U.S. PATENT DOCUMENTS

| | | | | |
|---|---|---|---|---|
| 2015/0295273 A1* | 10/2015 | Kim | ............... | H01M 10/0459 |
| | | | | 429/154 |
| 2015/0303426 A1* | 10/2015 | Kim | ............... | B29C 65/08 |
| | | | | 429/163 |
| 2016/0256963 A1* | 9/2016 | Hwang | ............... | B23K 37/0443 |
| 2016/0380302 A1* | 12/2016 | Yun | ............... | H01M 10/0431 |
| | | | | 429/94 |

* cited by examiner

JIG HAVING VARIABLE STRUCTURE DEPENDING ON SIZE OF RECEIVING PORTION OF CASE

CROSS-REFERENCE TO RELATED APPLICATION

This application claims priority to Korean Patent Application No. 10-2017-0009044 filed on Jan. 19, 2017, the contents of which are incorporated by reference in their entirety.

TECHNICAL FIELD

The present disclosure relates to a jig having a variable structure depending on a size of a receiving portion of a case.

RELATED ART

As the technical development of and the demand on mobile devices has increased, the demand on secondary batteries as energy sources has rapidly increased. Among such the secondary batteries, lithium secondary batteries, which have high energy density and high operating voltage, have been commercially available and widely used.

Typically, in terms of the shape of a battery, there is a high demand for a prismatic type secondary battery and a pouch-type secondary battery that can be applied to products such as mobile phones having a small thickness, and in terms of materials of the battery, there is a high demand for lithium secondary batteries such as lithium ion batteries and lithium ion polymer batteries having high energy density, discharge voltage, output stability, and the like.

The secondary battery may be classified into a cylinder type battery cell, a prismatic type battery cell, and a pouch-shaped battery cell according to the shape of the secondary battery. Among the above battery cells, the pouch-shaped battery cell which can be stacked with a high degree of integration, has a high energy density per unit weight, is inexpensive, and is easy to deform is attracting much attention.

The pouch-shaped secondary battery uses a laminate sheet as a battery case and has a structure in which an electrode assembly and an electrolyte are embedded together in a storage formed on such a laminate sheet.

Recently, even though a new shape of battery cell is required due to a trend of a slim type battery or various designs being required, conventional battery cells are composed of an electrode assembly having the same size or capacity and a battery case corresponding to the size or capacity. Accordingly, it is necessary to reduce a capacity of a battery cell or change a shape thereof to manufacture a new battery cell with a new shape in consideration of a design of a device to which the battery cell is applied.

Furthermore, even though a manufacturing device having various sizes and structures is required to manufacture those various types of battery cells, a battery cell is currently manufactured using standardized devices according to the shape of the battery cell, and a problem in terms of a cost or a space in which the devices are disposed occurs.

Such a problem is disclosed in Korean Patent Publication No. 10-2011-0128594, which is a technique for changing sizes and shapes of a mold and a punch according to the size and shape of a secondary battery.

Accordingly, there is a high need for a technique that can be applied to secondary batteries having various sizes and shapes without making a separate manufacturing device corresponding to the shape of a battery cell.

SUMMARY

The present disclosure is provided to solve the above-described problems of the related art and technical problems which have been identified in the past.

Specifically, the present disclosure provides a jig device capable of changing its shape by adjusting any one of a width, a length, and a height thereof without additional manufacturing devices corresponding to various shapes of battery cells being required so that a problem of a cost and a space required for the additional manufacturing devices is solved and various shapes of battery cells according to a design of a device can be manufactured.

According to an aspect of the present disclosure, there is provided a jig device which is configured to manufacture a battery cell in which an electrode assembly is embedded in a battery case made of a laminate sheet including a resin layer and a metal layer, the jig device including: a die assembly having an inwardly recessed structure corresponding to a storage configured to mount the electrode assembly located on the laminate sheet or a portion to be molded of the storage; and a fixing die configured to fix an outer periphery of the sheet in a normal position.

The die assembly is configured to allow adjustment of at least one of a width and a length of the inward recess according to a size of the electrode assembly.

That is, the jig device according to the present disclosure is capable of adjusting dimensions of the inward recess in which the storage is seated corresponding to shapes of battery cells to be manufactured so that the jig device can be used to manufacture various shapes of battery cells without additional manufacturing devices. Accordingly, a time and cost required for making additional jig devices corresponding to various shapes of battery cells may be reduced and productivity may be improved.

In one specific example, the die assembly may include: mold assemblies each having a structure capable of adjusting a height thereof corresponding to a depth of the storage; and a base plate having an upper surface on which the mold assemblies are mounted.

The mold assembly may each have a structure coupled to the base plate so that mounting positions of the mold assemblies can be adjusted to correspond to at least one of a width and a length of an outer periphery of the storage on a plane.

Further, a shape of the storage is closely related to a capacity of a battery cell because a shape or size of the battery cell generally varies depending on a structure of an electrode assembly embedded in the storage. Accordingly, the jig device used to manufacture battery cells of various shapes is capable of adjusting dimensions of the storage in a plane.

For this, the mold assemblies of the present disclosure are coupled such that positions to be mounted on the base plate are adjustable so that a size of a sectional area of the storage can be adjusted, and each of the mold assemblies has a structure in which the depth of the inward recess can be adjusted to correspond to the depth of the storage.

For example, a depth or area of the inward recess may be adjusted by adjusting the height of the mold assemblies for an electrode assembly having a large thickness, and by moving the positions at which the mold assemblies are mounted on the base plate for an electrode assembly having a wide sectional area.

In order to achieve this objective, each of the mold assembly may include a first mold located on a lowermost side of the mold assembly and coupled to the upper surface of the base plate so that the mounting position can be adjusted; and a second mold located at an upper end of the first mold and having a structure in which at least one or more plate-type members are stacked to be adjustable in height corresponding to the depth of the storage.

That is, the mounting positions of the mold assemblies are determined by the first molds so that either a width or a length of the sectional area of the storage may be adjusted according to the mounting position of the first mold, and a height of the mold assemblies is determined by a stacking height of the plate-type members constituting the second mold so that dimensions of the inward recess corresponding to the depth of the storage may be adjusted by adjusting the number of plate-type members stacked.

For example, each of the plate-type members constituting the second mold may have a structure having the same shape and height.

Here, the plate-type members may have a structure in which no step is formed when the plate-type members are stacked due to having the same sectional area thereof, or a sectional area thereof decreases from a plate-type member coupled to the first mold toward a plate-type member at the uppermost layer.

In one specific example, the mold assembly may further include one or more mold coupling members to maintain a coupling structure between the first and second molds.

The mold coupling member may include a support passing-through fastening holes formed in the plate-type members constituting the second mold to be coupled with the second mold in a state being inserted into and fixed in a recess formed in an upper end of the first mold.

In order for the mold assemblies to be mounted on the base plate, the base plate may have a structure in which insertion grooves are formed on one surface facing the first mold, and coupling parts having a hook structure capable of being coupled to the insertion grooves are formed to protrude on the first mold.

Here, one or more insertion grooves may be formed at positions corresponding to an outer periphery of the storage in a linear or dot shape of a slit structure, and may have a structure arranged outwardly from the outer periphery of the storage. Accordingly, the coupling part formed on the first mold may have a hook structure having a slit or a dot shape corresponding to the shape of the insertion groove.

Further, a plurality of insertion grooves are arranged outwardly from each side corresponding to the outer periphery of the storage so that the jig device can be adjusted to fit a size of a battery cell by adjusting the coupling position of the base plate and the mold assemblies of one side and at least one side of a plurality of sides of the storage to correspond to a size of a sectional area of the storage.

Such a variable jig can be used when a battery case is manufactured and may be a structure further including a punch configured to press a portion to be molded of the storage and mold the storage by deep drawing.

In a state in which an electrode assembly is mounted, the storage may be mounted on the inward recess to fix a battery cell in a normal position, thereby preventing wrinkles from forming on an outer surface of the battery cell during a degassing process in which one surface of the battery cell is pressed to remove gas inside the battery cell, accordingly, the present disclosure may include a battery cell manufacturing device including a variable jig having various uses as described above.

As described above, the jig device according to the present disclosure allows a size of an inward recess corresponding to a storage or a portion to be molded of the storage to be adjusted to correspond to a shape and size of a battery cell, specifically, a dimension of a sectional area of the inward recess may be adjusted by adjusting positions at which mold assemblies are mounted on a base plate, and a depth of the inward recess may be adjusted by adjusting a height of the mold assemblies so that the jig device may be used for manufacturing various types of battery cells without additional devices being made.

BRIEF DESCRIPTION OF THE DRAWINGS

The following drawings attached to the specification illustrate exemplary examples of the present disclosure and serve to enable technical concepts of the present disclosure to be further understood together with detailed description of the disclosure given below, and therefore the present disclosure is not to be interpreted only with matters in such drawings.

DETAILED DESCRIPTION

Hereinafter, exemplary embodiments of the present disclosure will be described in detail with reference to the drawings, which are for facilitating understanding of the present disclosure, and the scope of the present disclosure is not limited thereto.

Figure 1:
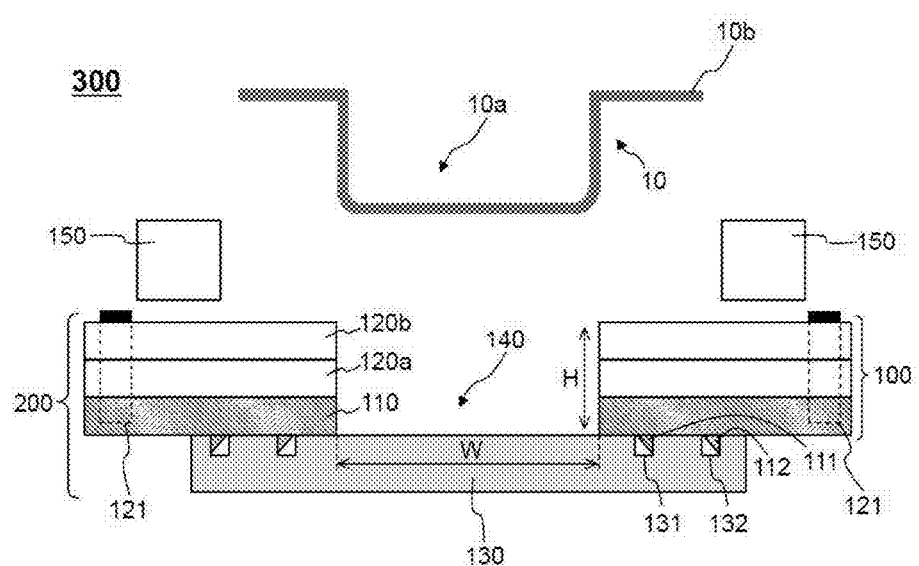
FIG. 1 is a schematic view of a vertical section of a jig device according to one exemplary embodiment of the present disclosure.

FIG. 1 is a schematic view of a vertical section of a variable jig device according to one exemplary embodiment of the present disclosure.

Referring to FIG. 1, a jig device 300 includes a die assembly 200 including an inward recess 140 corresponding to a storage 10a located on a laminate sheet 10, and fixing dies 150 located on an upper side of the die assembly 200 to press and fix an outer periphery 10b of the sheet 10.

The die assembly 200 includes mold assemblies 100 configured to allow a height of the inward recess 140 to be adjusted corresponding to a depth of the storage 10a and a base plate 130 having an upper surface on which the mold assemblies 100 are mounted.

Each of the mold assemblies 100 includes a first mold 110 coupled to the upper surface of the base plate 130 and a second mold 120 located on an upper end of the first molds 110 and including two plate-type members 120a and 120b stacked so that the height of the inward recess 140 may be adjusted.

Here, the height of the inward recess 140 may be adjusted by adjusting a height H of the mold assemblies 100 because the height of the inward recess 140 is equal to the height H of the mold assemblies 100, and thus it can be adjusted according to the depth of the storage 10a.

Specifically, since the height of the mold assemblies 100 is adjustable by adjusting the number of the plate-type members 120a and 120b constituting the second mold 120 stacked, the height of the inward recess 140 may be set to be deep to manufacture a battery cell having a large thickness by increasing the number of the plate-type members 120a and 120b stacked to be two or more, or by making each of the plate-type members 120a and 120b thicker, and the height of the inward recess 130 may be set to be low to manufacture a battery cell having a small thickness by reducing the number of the plate-type members 120a and 120b stacked or by making each of the plate-type members 120a and 120b thinner.

The coupling between the first mold 110 and the second mold 120 is achieved by a support 121 formed in an upper end of the first mold 110 passing-through fastening holes (not shown) formed in the plate-type members 120a and 120b so that the plate-type members 120a and 120b constituting the second mold 120 are stacked on the upper portion of the first mold 110 in a state in which the support 121 is inserted into and fixed to a recess formed at the upper end of the first mold 110.

Insertion grooves 131 and 132 which are inwardly recessed are formed on one surface of the base plate 130 facing the first mold 110, that is, at an upper end of the base plate 130, and coupling parts 111 and 112 which may be coupled to the insertion grooves 131 and 132 are formed at a lower end of the first mold 130 so that the mold assemblies 100 can adjust a width W of the inward recess 140 by varying a position at which the first mold 110 is coupled or mounted on the base plate 130 in a horizontal plane.

Figure 2:
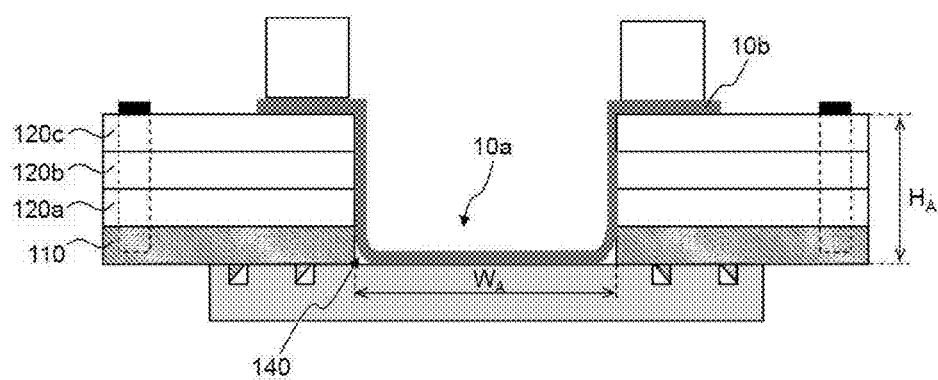
FIG. 2 and FIG. 3 are schematic views showing a state in which a storage of a battery cell is seated in a jig device according to an exemplary embodiment of the present disclosure.
Figure 3:
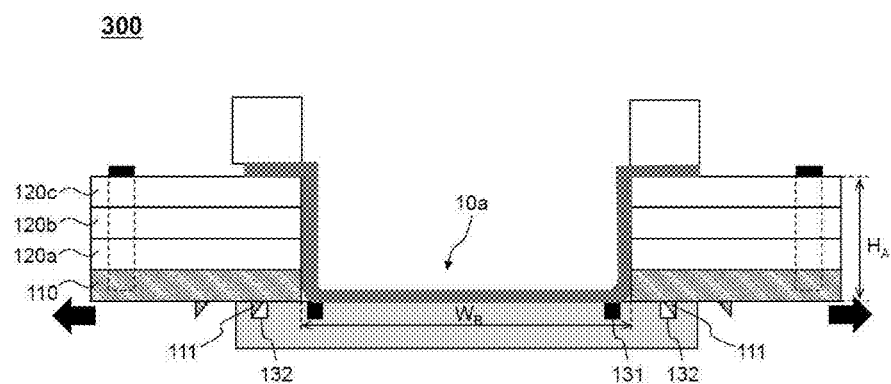

FIG. 2 and FIG. 3 are schematic views showing a state in which a storage of a battery cell is seated in a jig device according to an exemplary embodiment of the present disclosure.

First, referring to FIG. 2 along with FIG. 1, the die assembly 300 includes the inward recess 140 having a structure corresponding to the storage 10a used for a battery cell (not shown) having a small width $W_A$ and a large thickness $H_A$. Specifically, the number of plate-type members 120a, 120b, and 120c constituting the second mold 120 of the mold assembly 100 stacked is increased to three to form the inward recess 140 with a large depth to correspond to the shape of the above-described storage 10a.

Next, referring to FIG. 3 along with FIGS. 1 and 2, the die assembly 300 includes the inward recess 140 having a structure corresponding to the storage 10a used for a battery cell having a large width $W_B$ and a large thickness $H_A$. Unlike FIG. 2, the mold assemblies 100 are moved in directions of arrows by changing positions of the insertion grooves 132 to which the coupling parts 111 formed on the first molds 110 are to be coupled, and the inward recess 140 formed by increasing a separation distance between the mold assemblies 100 corresponds to a shape of the storage 10a having the large width $W_B$.

Figure 4:
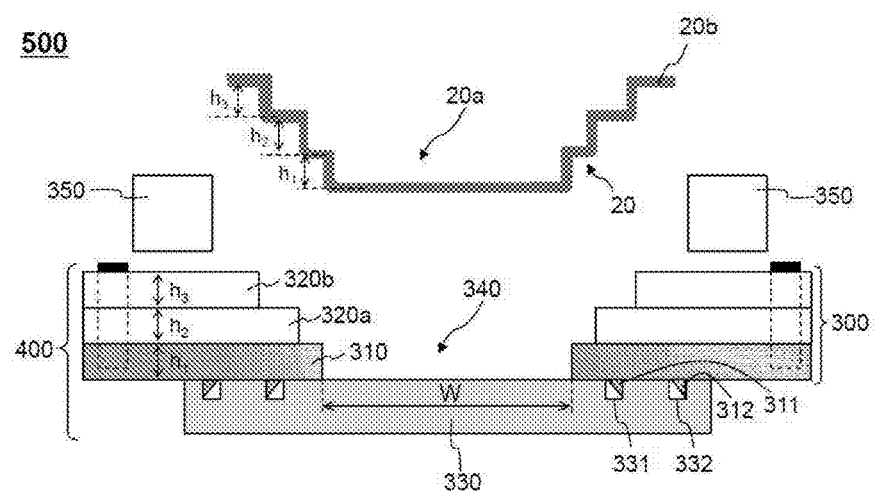
FIG. 4 is a schematic view of a vertical section of a jig device according to another exemplary embodiment of the present disclosure.

FIG. 4 is a schematic view of a vertical section of a jig device according to another exemplary embodiment of the present disclosure.

Referring to FIG. 4, a storage 20a formed on a laminate sheet 20 has a side portion on which a stair-form step is formed, and a jig device 500 includes a die assembly 400 including an inward recess 340 having step portions corresponding to the storage 20a, and fixing dies 350 located on an upper side of the die assembly 400 to press and fix an outer periphery 20b of the sheet 20.

Comparing the jig device 500 of FIG. 4 with the jig device 300 of FIG. 1, it can be seen that there is a difference in that a stepped structure is formed in the inward recess 340.

The die assembly 400 includes mold assemblies 300 configured to enable a height of the inward recess 340 to be adjusted corresponding to a depth of the storage 20a, and a base plate 330 having an upper surface on which the mold assemblies 300 are mounted.

Each of the mold assemblies 300 includes a first mold 310 coupled to the upper surface of the base plate 330, and a second mold 320 located on an upper end of the first mold 310 and including two plate-type members 320a and 320b stacked so that the height of the inward recess 340 may be adjusted.

Although the plate-type members 320a and 320b constituting the second mold 320 have the same shape, sectional areas of the plate-type members 320a and 320b decrease from the first mold 310 toward an upper layer, and thus the plate-type member 320a has a smaller sectional area than the first mold 310. Accordingly, a structure including stair-form steps is formed on an inside of the mold assembly 300, that is, on the inward recess 340, due to a structure in which the mold assemblies 300 having different sectional areas are stacked.

The steps formed on the inward recess 340 have different heights h1, h2, and h3 corresponding to a stair-form structure formed on a side surface of the storage 20a and have a structure in which the heights of the steps decrease in a depthwise direction of the inward recess 340 so that a relationship between the heights of the steps is h3>h2>h1. Accordingly, under such a structure, it is possible to minimize a change in a thickness of the storage 20a caused by elongation in a process of forming the storage 20a and form the storage 20a having a constant thickness using the jig 500, thereby securing overall durability of the battery case to be eventually manufactured.

Insertion grooves 331 and 332 which are inwardly recessed are formed on one surface of the base plate 330 facing the first mold 310, that is, at an upper end of the base plate 130 and coupling parts 311 and 312 which may be coupled to the insertion grooves 331 and 332 are formed at the lower end of the first mold 310 so that the mold assemblies 300 can adjust a width W of the inward recess 340 by varying a position at which the first mold 310 is coupled or mounted on the base plate 330.

It should be understood by those skilled in the art that various changes may be made to the embodiments without departing from the spirit and scope of the present disclosure.

The invention claimed is:

1. A variable jig which is a jig device to manufacture a battery cell in which an electrode assembly is embedded in a battery case made of a laminate sheet including a resin layer and a metal layer, comprising:
   a die assembly having an inwardly recessed structure corresponding to a storage configured to mount the electrode assembly located on the laminate sheet or a portion to be molded as the storage; and
   a fixing die configured to fix an outer periphery of the sheet in a normal position,
   wherein the die assembly is configured to allow adjustment of at least one of a width or a length of the inward recess according to a size of the electrode assembly.

2. The variable jig of claim 1, wherein the die assembly comprises:
   a mold assembly having a structure capable of adjusting a height thereof corresponding to a depth of the storage; and
   a base plate having an upper surface on which the mold assembly is mounted,
   wherein the mold assembly includes a structure coupled to the base plate so that mounting positions of the mold assembly can be adjusted to correspond to at least one of a width or a length of an outer periphery of the storage horizontally.

3. The variable jig of claim 2, wherein the mold assembly comprises:
a first mold located on a lowermost side of the mold assembly and coupled to the upper surface of the base plate so that the mounting position can be adjusted; and
a second mold located at an upper end of the first mold and having a structure in which at least one or more plate-type members are stacked to be adjustable in height corresponding to the depth of the storage.

4. The variable jig of claim 3, wherein each of the plate-type members constituting the second mold has a structure having the same shape and height.

5. The variable jig of claim 4, wherein the plate-type members have a structure in which no step is formed when the plate-type members are stacked due to the same sectional area thereof.

6. The variable jig of claim 4, wherein a sectional area of the plate-type members decreases from a plate-type member coupled to the first mold toward a plate-type member at the uppermost layer.

7. The variable jig of claim 3, wherein the mold assembly further comprises one or more mold coupling members to maintain a coupling structure between the first and second molds.

8. The variable jig of claim 7, wherein the mold coupling member includes a support passing-through fastening holes formed in the plate-type members constituting the second mold to be coupled with the second mold in a state being inserted into and fixed in a recess formed in an upper end of the first mold.

9. The variable jig of claim 3, wherein
the base plate includes insertion grooves formed on a surface facing the first mold, and
the first mold includes coupling parts formed to protrude, having a hook structure capable of being coupled to the insertion grooves.

10. The variable jig of claim 9, wherein the insertion grooves are a slit structure of a linear or dot shape, at least one of the insertion grooves are formed at positions corresponding to an outer periphery of the storage, and have a structure arranged outwardly from the outer periphery of the storage.

11. The variable jig of claim 1, wherein the jig device further comprises a punch configured to press a portion to be molded as the storage and mold the storage by deep drawing.

12. A battery cell manufacturing device comprising the variable jig of claim 1.

* * * * *